(12) United States Patent
Honda (10) Patent No.: US 10,131,015 B2
(45) Date of Patent: Nov. 20, 2018

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Kazuhiro Honda, Tokyo (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 173 days.

(21) Appl. No.: 15/119,606

(22) PCT Filed: Dec. 25, 2015

(86) PCT No.: PCT/JP2015/086305
§ 371 (c)(1),
(2) Date: Aug. 17, 2016

(87) PCT Pub. No.: WO2017/109965
PCT Pub. Date: Jun. 29, 2017

(65) Prior Publication Data
US 2018/0015564 A1 Jan. 18, 2018

(51) Int. Cl.
*B23K 15/00* (2006.01)
*B22F 3/105* (2006.01)
(Continued)

(52) U.S. Cl.
CPC .......... *B23K 15/0086* (2013.01); *B22F 3/105* (2013.01); *B22F 3/16* (2013.01);
(Continued)

(58) Field of Classification Search
CPC ......... B33Y 10/00; B33Y 30/00; B33Y 50/00; B33Y 50/02; B29C 64/386;
(Continued)

(56) References Cited

U.S. PATENT DOCUMENTS

2005/0104241 A1 5/2005 Kritchman et al.
2013/0094897 A1* 4/2013 Vosters .............. B23K 15/0006
403/270

FOREIGN PATENT DOCUMENTS

EP  1 674 243 A1  6/2006
EP  2 928 670 B1  5/2016
(Continued)

OTHER PUBLICATIONS

International Search Report (ISR) dated Mar. 22, 2016 for International Application No. PCT/JP2015/086305.
(Continued)

*Primary Examiner* — Christopher Kim
(74) *Attorney, Agent, or Firm* — Ladas & Parry LLP (57) ABSTRACT

A recoater that is two-dimensionally driven is cooled by a simple structure. A three-dimensional laminating and shaping apparatus includes at least one material spreader that spreads a material of a three-dimensional laminated and shaped object, a temperature measurer that measures a temperature of the material spreader, at least one cooler that cools the material spreader and is provided at a standby position at which the material spreader stands by while the material is not spread, and a controller that controls the material spreader. The controller moves the material
(Continued)

spreader to the standby position to bring the material spreader and the cooler into contact with each other.

7 Claims, 11 Drawing Sheets

(51) Int. Cl.
　　*B22F 3/16*　　　　(2006.01)
　　*B33Y 10/00*　　　(2015.01)
　　*B33Y 30/00*　　　(2015.01)
　　*B33Y 50/00*　　　(2015.01)
　　*B33Y 50/02*　　　(2015.01)

(52) U.S. Cl.
　　CPC .......... *B23K 15/0026* (2013.01); *B33Y 10/00* (2014.12); *B33Y 30/00* (2014.12); *B33Y 50/00* (2014.12); *B33Y 50/02* (2014.12)

(58) Field of Classification Search
　　CPC ......... G05B 2219/49018; B22F 3/1055; B22F 3/105; B22F 3/16; B23K 15/0086; B23K 15/0026
　　USPC ............... 219/121.13, 121.14; 118/101, 202; 239/128, 132–132.5
　　See application file for complete search history.

(56) References Cited

FOREIGN PATENT DOCUMENTS

| | | |
|---|---|---|
| JP | 2007-21747 A | 2/2007 |
| JP | 2012-11610 A | 1/2012 |
| JP | 2015-104837 A | 6/2015 |
| JP | 2015-193135 A | 11/2015 |
| WO | 2014/086943 A1 | 6/2014 |
| WO | 2015/079839 A1 | 6/2015 |

OTHER PUBLICATIONS

Written Opinion (WO) dated Mar. 22, 2016 for International Application No. PCT/JP2015/086305.
J-PlatPat English abstract of JP 2007-21747 A.
J-PlatPat English abstract of JP 2012-11610 A.
J-PlatPat English abstract of JP 2015-193135 A.
J-PlatPat English abstract of JP 2015-104837 A.
Supplementary European Search Report (SESR) dated Aug. 23, 2018 for Application No. EP 15 89 9115.
Yang, Y., et al., "3D printing of shape memory polymer for functional part fabrication", Int. J. Adv. Manuf. Technol., vol. 84, No. 9, Sep. 24, 2015, pp. 2079-2095.

\* cited by examiner

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is application under 35 U.S.C. 371 of International Application No. PCT/JP2015/086305 filed on Dec. 25, 2015, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of cooling a powder material by cooling a recoater roller (paragraph [0054] of the literature and the like).

CITATION LIST

Patent Literature

Patent literature 1: Japanese Patent Laid-Open No. 2007-21747

SUMMARY OF THE INVENTION

Technical Problem

The technique described in the above literature, however, cannot cool, by a simple structure, a recoater that is two-dimensionally driven.

The present invention enables to provide a technique of solving the above-described problem.

Solution To Problem

One aspect of the present invention provides a three-dimensional laminating and shaping apparatus comprising:
at least one material spreader that spreads a material of a three-dimensional laminated and shaped object;
a temperature measurer that measures a temperature of the material spreader;
at least one cooler that cools the material spreader and is provided at a standby position at which the material spreader stands by while the material is not spread; and
a controller that controls the material spreader,
wherein the controller moves the material spreader to the standby position to bring the material spreader and the cooler into contact with each other.

Another aspect of the present invention provides a control method of a three-dimensional laminating and shaping apparatus, comprising:
spreading a material by a material spreader;
measuring a temperature of the material spreader; and
controlling movement of the material spreader so as to bring, into contact with each other, the material spreader and a cooler of the material spreader, that is provided at a standby position at which the material spreader stands by while the material is not spread.

Still other aspect of the present invention provides a control program of a three-dimensional laminating and shaping apparatus, for causing a computer to execute a method, comprising:
spreading a material by a material spreader;
measuring a temperature of the material spreader; and
controlling movement of the material spreader so as to bring, into contact with each other, the material spreader and a cooler that cools the material spreader and is provided at a standby position at which the material spreader stands by while the material is not spread.

Advantageous Effects of Invention

According to the present invention, it is possible to cool, by a simple structure, a recoater that is two-dimensionally driven.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 according to the first embodiment of the present invention will be described with reference to FIGS. 1 to 6. The three-dimensional laminating and shaping apparatus 100 is an apparatus for shaping a three-dimensional laminated and shaped object by spreading a material 120 of the three-dimensional laminated and shaped object on a shaping surface, melting and solidifying the material by irradiating the spread material 120 with an electron beam or the like, and laminating the material.

<Technical Premise>

Figure 6A:
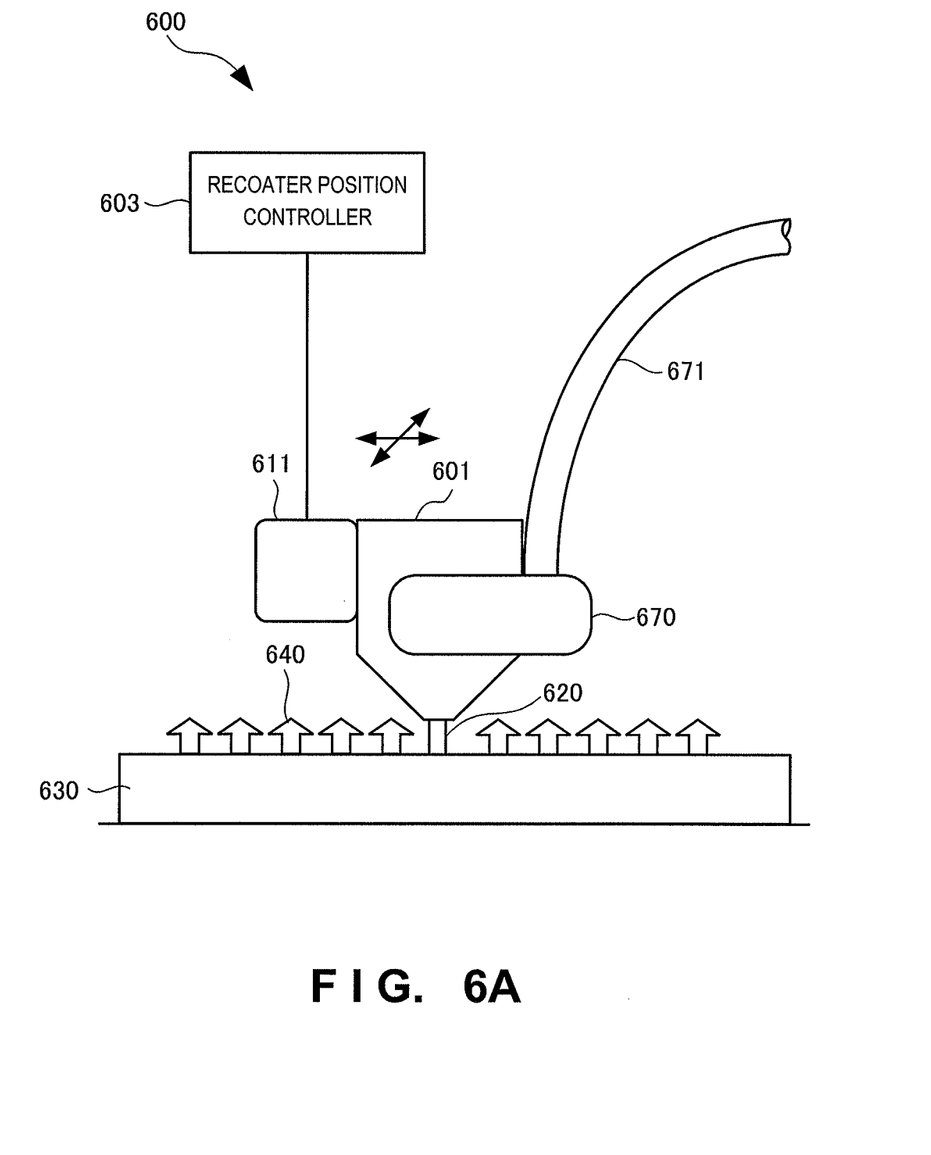
FIG. 6A is a view for explaining a three-dimensional laminating and shaping apparatus according to a technical premise of the three-dimensional laminating and shaping apparatus according to the first embodiment of the present invention.
Figure 6B:
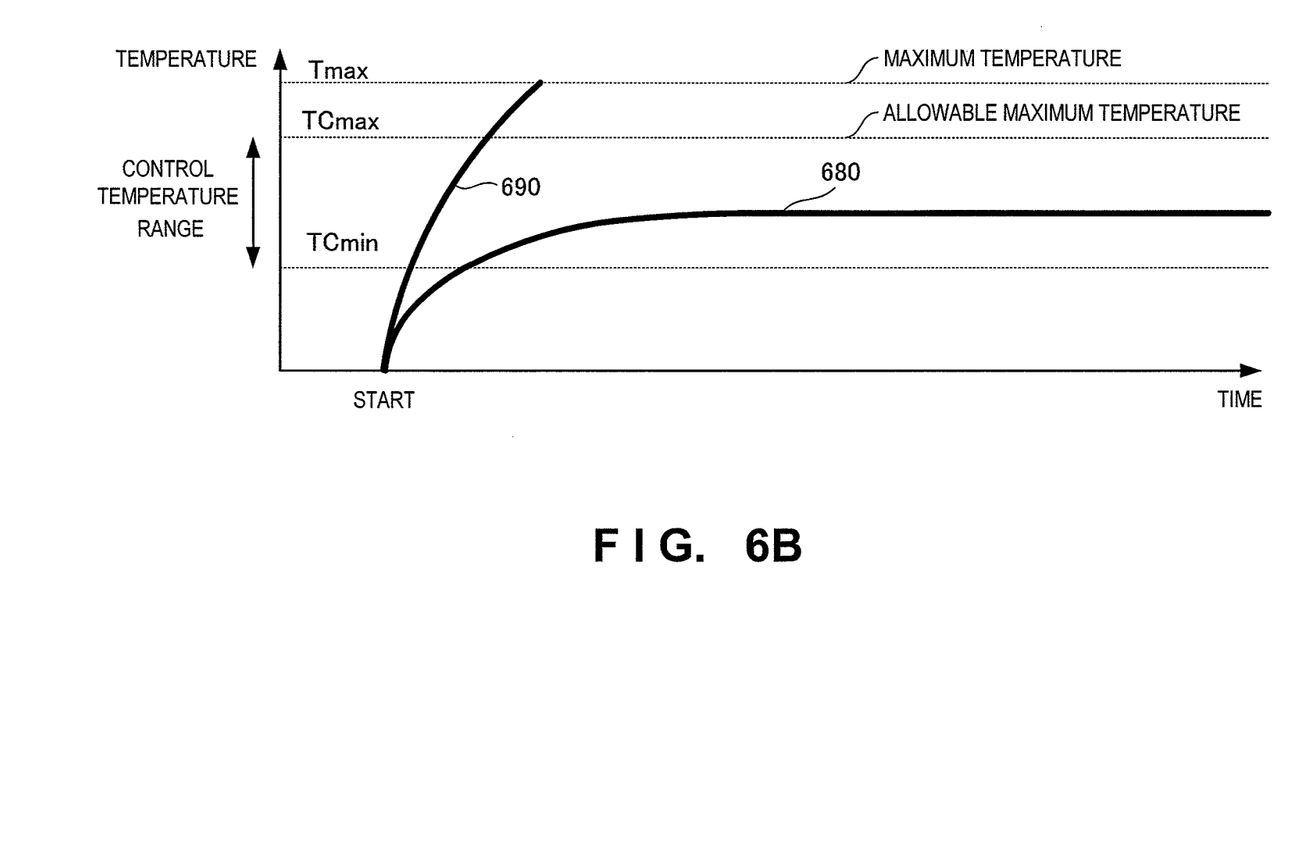
FIG. 6B is a timing chart for explaining a temperature change caused by radiant heat of the recoater of the three-dimensional laminating and shaping apparatus according to the technical premise of the three-dimensional laminating and shaping apparatus according to the first embodiment of the present invention.

A technical premise of this embodiment will be described first with reference to FIGS. 6A and 6B. FIG. 6A is a view for explaining a three-dimensional laminating and shaping apparatus 600 according to the technical premise of the three-dimensional laminating and shaping apparatus according to this embodiment. FIG. 6B is a timing chart for explaining a temperature change caused by radiant heat of a recoater 601 of the three-dimensional laminating and shaping apparatus 600 according to the technical premise of the three-dimensional laminating and shaping apparatus according to this embodiment.

The three-dimensional laminating and shaping apparatus 600 includes the recoater 601. The recoater 601 moves closer to the shaping surface (laminating and shaping surface) of a three-dimensional laminated and shaped object 630, and spreads a metal powder or the like as a material 620 of the three-dimensional laminated and shaped object 630. The three-dimensional laminating and shaping apparatus 600 melts and solidifies the material 620 by irradiating the spread material 620 with a beam such as an electron beam, thereby shaping the three-dimensional laminated and shaped object.

A recoater driver 611 is attached to the recoater 601. When the recoater driver 611 two-dimensionally moves, the recoater 601 two-dimensionally moves to spread the material 620 on the laminating and shaping surface. A recoater position controller 603 controls the recoater driver 611 by transmitting a control signal to it. In general, the material 620 is preheated and heated by the electron beam or the like, and the surface temperature of the material 620 may become about 1,000° C. depending on a laminating condition.

If a shaping chamber is filled with a gas atmosphere, the recoater 601 is heated by the gas atmosphere. Alternatively, if the shaping chamber is a vacuum, the recoater 601 is heated by radiant heat 640 from the preheated or heated material 620. As a result, the temperature of the recoater 601 rises. Since the recoater 601 is made of a metal such as stainless steel or iron, a cooler 670 is attached to the recoater 601 so the temperature of the recoater 601 does not rise to a temperature equal to or higher than the heat-resistant temperature (melting temperature) of the recoater 601. A cooling pipe 671 for allowing a coolant to flow to the cooler 670 is attached to the cooler 670. The recoater 601 is cooled by the cooler 670.

A temperature change of the recoater 601 will be described with reference to FIG. 6B. A point of time at which the recoater 601 moves onto the surface of the material 620 is set as "start". If the cooler 670 is attached to the recoater 601, the temperature of the recoater 601 can be maintained within a control temperature range (TCmin to TCmax), as indicated by a graph 680.

However, since structures such as the cooler 670 and the cooling pipe 671 are attached to the recoater 601, a method of cooling the recoater 601 by circulating the coolant limits the movement of the recoater 601. This also imposes a problem that the apparatus arrangement becomes complicated and a problem that the coolant and a vibration of the cooling pipe 671 are transferred to the recoater 601 to degrade the position accuracy of the spread material.

To the contrary, a method which uses neither the cooler 670 nor the cooling pipe 671 does not limit the movement of the recoater 601. However, as indicated by a graph 690, the recoater 601 cannot sufficiently be cooled, and the temperature of the recoater 601 undesirably reaches the maximum temperature (Tmax). For example, if the shaping chamber is a vacuum, heat accumulated in the recoater 601 cannot be dissipated, thereby causing the temperature of the recoater 601 to readily reach the maximum temperature.

Technique of Embodiment

Figure 1:
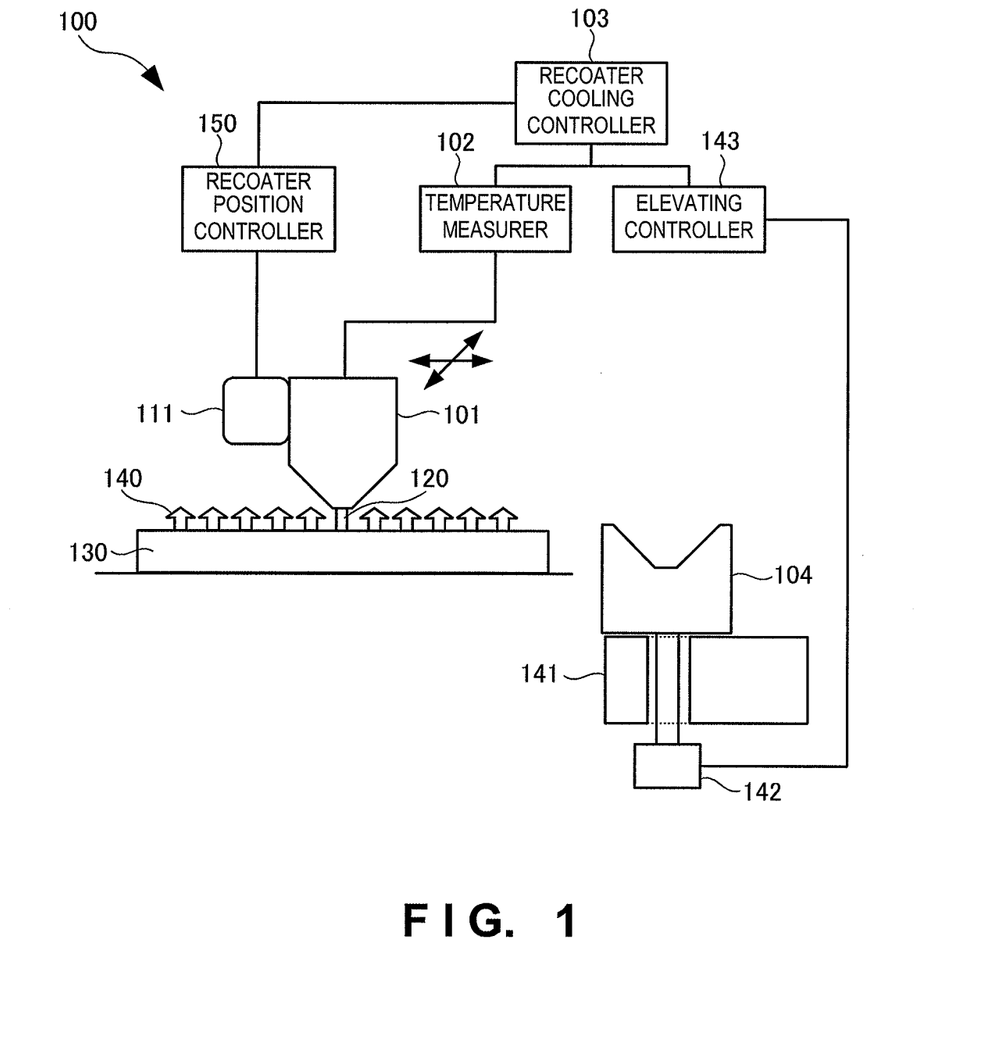
FIG. 1 is a view schematically showing the arrangement of a three-dimensional laminating and shaping apparatus according to the first embodiment of the present invention.
Figure 2:
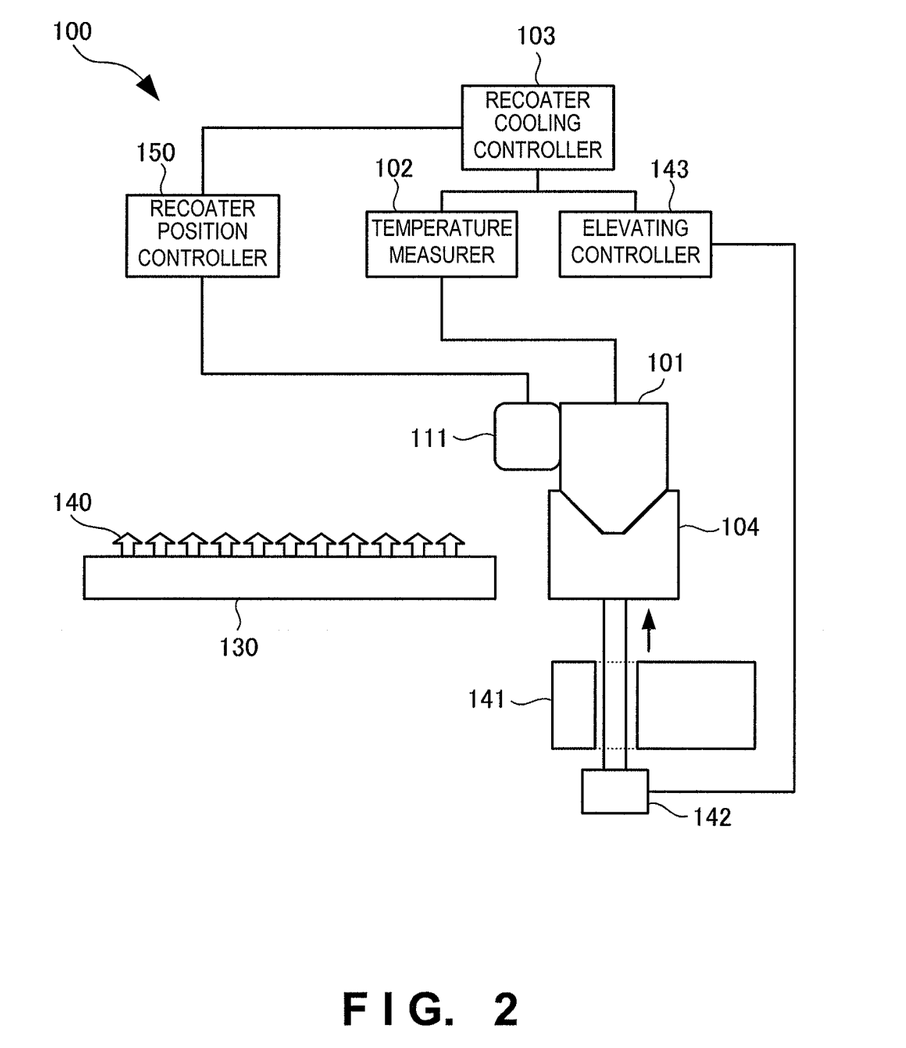
FIG. 2 is a view schematically showing the arrangement of the three-dimensional laminating and shaping apparatus according to the first embodiment of the present invention.

The technique of this embodiment will be described next with reference to FIGS. 1 to 5. FIGS. 1 and 2 are views each schematically showing the arrangement of the three-dimensional laminating and shaping apparatus according to this embodiment, and respectively show a state in which the material is spread and a state in which a recoater is cooled.

As shown in FIGS. 1 and 2, the three-dimensional laminating and shaping apparatus 100 includes a recoater 101, a temperature measurer 102, a recoater cooling controller 103, and a cooling head 104.

The recoater 101 is a material spreading mechanism of spreading, on a shaping surface, a metal powder such as a titanium (Ti) powder or the like as the material 120 of a three-dimensional laminated and shaped object 130, and is two-dimensionally (in the X and Y directions) driven on the shaping surface.

A recoater driver 111 is attached to the recoater 101. A recoater position controller 150 controls the movement of the recoater 101. More specifically, the recoater position controller 150 transmits a control signal to the recoater driver 111. Upon receiving the control signal, the recoater driver 111 two-dimensionally drives the recoater 101 based on the received control signal.

The temperature measurer 102 measures the temperature of the recoater 101. The material 120 is maintained in a high-temperature state by heating by a heater (not shown) or preheating or heating by irradiation with the electron beam. For example, if the shaping chamber is filled with a gas or evacuated, the recoater 101 is heated by heat of the gas or radiant heat of the material 120 heated to a high temperature. If the temperature of the recoater 101 becomes equal to or higher than a predetermined temperature, the temperature measurer 102 transmits, to the recoater cooling controller 103, an alert signal or the like indicating that the temperature is equal to or higher than the predetermined temperature.

Upon receiving the alert signal, the recoater cooling controller 103 transmits a signal to the recoater position controller 150 and an elevating controller 143. As shown in FIG. 2, the recoater position controller 150 controls the recoater driver 111 to move the recoater 101 to a standby position (home position), that is, a space above the cooling head 104.

The elevating controller 143 transmits a signal to an elevator 142. Upon receiving the signal, the elevator 142 moves up the cooling head 104 to a predetermined position to bring the cooling head 104 moved up to the predetermined position into contact with the recoater 101 moved to the standby position. This transfers heat accumulated in the recoater 101 to the cooling head 104, and thus the temperature of the recoater 101 lowers. The cooling head 104 is typically made of a metal such as copper (Cu), silver (Ag), gold (Au), aluminum (Al), zinc (Zn), nickel (Ni), or iron (Fe) having a high thermal conductivity. The present invention, however, is not limited to them, and an alloy of these metals or the like may be used.

While the recoater 101 is not at the standby position, for example, while the recoater 101 spreads the material 120, the cooling head 104 is in contact with a cooling medium 141 (heat sink). In this state, the cooling head 104 dissipates heat transferred from the recoater 101 and accumulated in the cooling head 104. Note that while the recoater 101 does not spread the material 120, for example, while the material 120 is irradiated with the electron beam or the like, the recoater 101 stands by at the standby position (home position). The recoater 101 may be replenished with the material 120 while the recoater 101 is at the standby position and is in contact with the cooling head 104 or upon end of cooling of the recoater 101.

Figure 3:
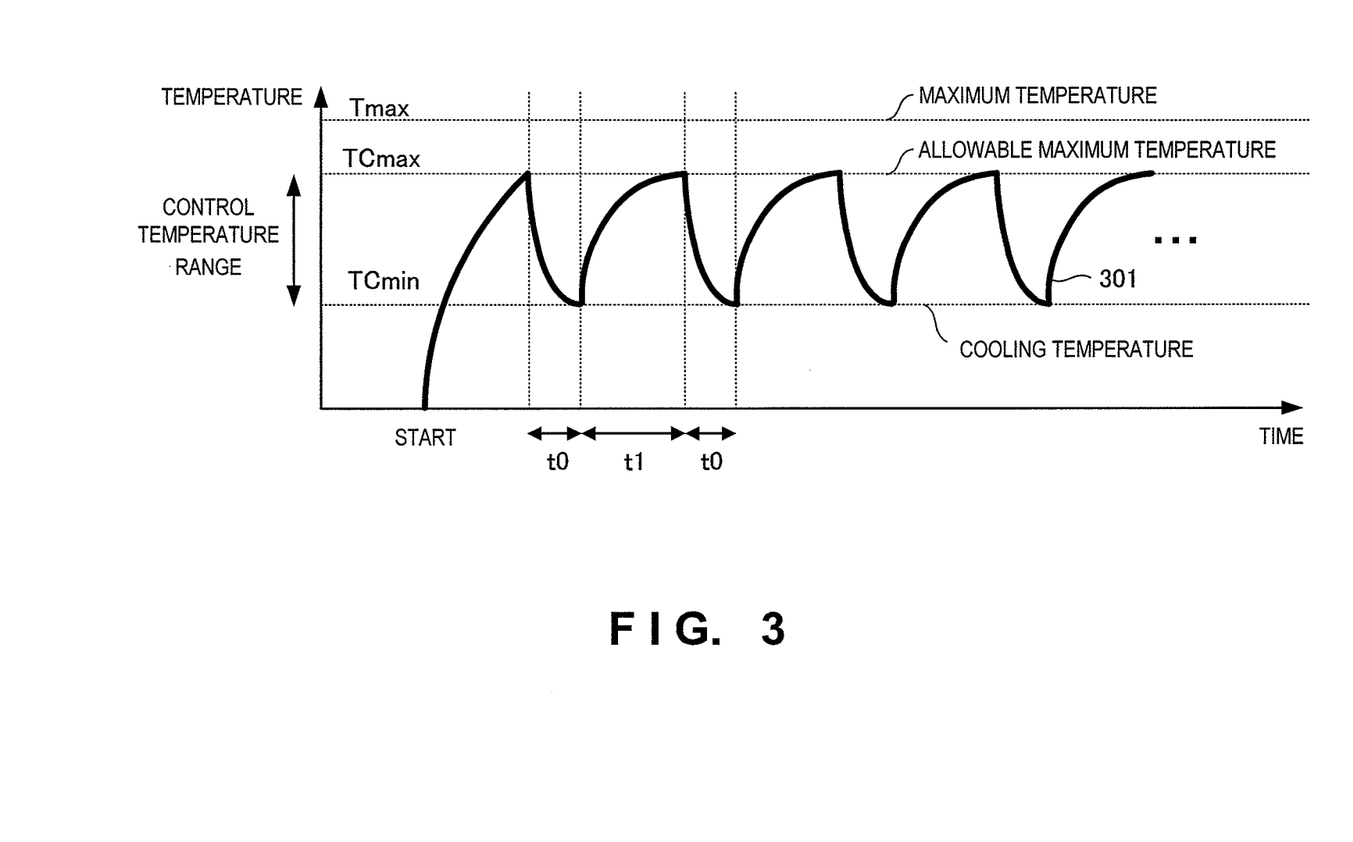
FIG. 3 is a timing chart for explaining a temperature change of the recoater of the three-dimensional laminating and shaping apparatus according to the first embodiment of the present invention.

FIG. 3 is a timing chart for explaining a temperature change of the recoater 101 of the three-dimensional laminating and shaping apparatus 100 according to this embodiment. As indicated by a graph 301, the temperature of the recoater 101 which has started to spread the material 120 gradually rises, and reaches an allowable maximum temperature (TCmax). When the temperature of the recoater 101 reaches the allowable maximum temperature (TCmax), the recoater 101 moves to the standby position (home position) to contact the cooling head 104, and dissipates heat accumulated in the recoater 101. If heat in the recoater 101 is dissipated, the temperature of the recoater 101 lowers, and reaches a cooling temperature (period t0).

When the temperature of the recoater 101 lowers to the cooling temperature, the recoater 101 restarts the spread of the material 120. The temperature of the recoater 101 which has restarted the spread of the material 120 rises again, and reaches the allowable maximum temperature again (period t1). When the temperature of the recoater 101 reaches the allowable maximum temperature, the recoater 101 moves to the standby position again to contact the cooling head 104, and dissipates heat accumulated in the recoater 101. The recoater 101 restarts the spread of the material 120. The three-dimensional laminating and shaping apparatus 100 controls the temperature of the recoater 101 to fall within the control temperature range (TCmax to TCmin). By executing such control, the temperature of the recoater 101 never exceeds the maximum temperature (Tmax).

Figure 4:
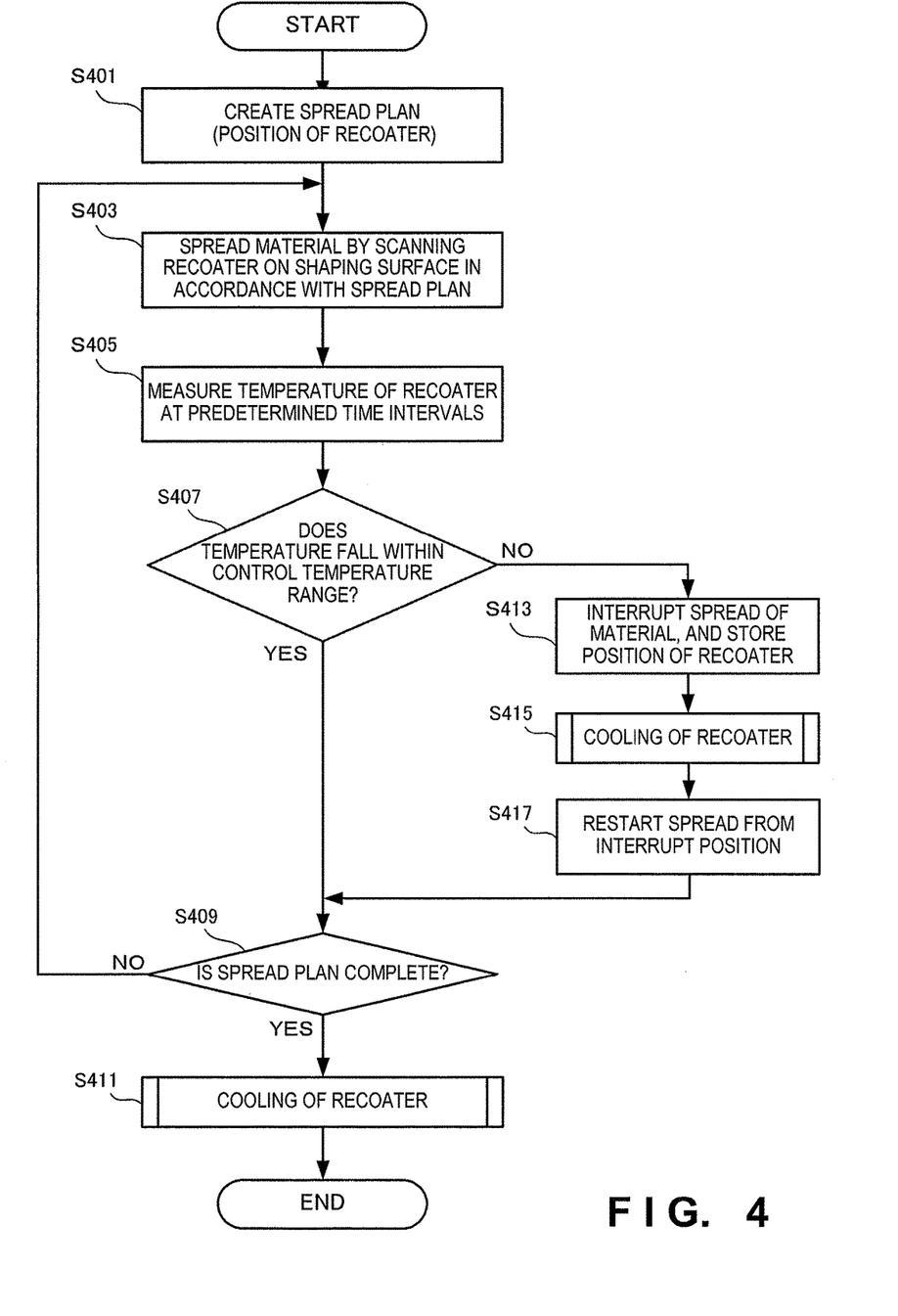
FIG. 4 is a flowchart for explaining the cooling procedure of the recoater by the three-dimensional laminating and shaping apparatus according to the first embodiment of the present invention.

FIG. 4 is a flowchart for explaining the cooling procedure of the recoater 101 of the three-dimensional laminating and shaping apparatus 100 according to this embodiment. In step S401, the three-dimensional laminating and shaping apparatus 100 creates a spread plan (the position of the recoater 101 on the shaping surface) of the material 120. In step S403, the three-dimensional laminating and shaping apparatus 100 spreads the material 120 by scanning the recoater 101 on the shaping surface in accordance with the created spread plan. In step S405, the temperature measurer 102 measures the temperature of the recoater 101 at predetermined time intervals (regular intervals). In step S407, the three-dimensional laminating and shaping apparatus 100 determines whether the temperature of the recoater 101 falls within the control temperature range. If the temperature of the recoater 101 falls within the control temperature range, the three-dimensional laminating and shaping apparatus 100 advances to step S409.

If it is determined in step S407 that the temperature of the recoater 101 falls outside the control temperature range, that is, if the temperature of the recoater 101 reaches or exceeds the allowable maximum temperature, the three-dimensional laminating and shaping apparatus 100 advances to step S413.

In step S413, the three-dimensional laminating and shaping apparatus 100 interrupts the spread of the material 120, stores a position at which the spread of the material by the recoater 101 has been interrupted, and moves the recoater 101 to the standby position. That is, if the temperature of the recoater 101 exceeds the predetermined temperature, even if the material is being spread, the recoater 101 is retreated to the standby position to prevent damage to the recoater 101.

In step S415, the three-dimensional laminating and shaping apparatus 100 cools the recoater 101. In step S417, the three-dimensional laminating and shaping apparatus 100 restarts the spread of the material 120 from the interrupt position of the spread of the material. Note that the three-dimensional laminating and shaping apparatus 100 may include a history storage that stores a history of the spread of the material by the recoater 101 so far when the spread of the material is interrupted. When the recoater 101 restarts the spread of the material, it may restart the spread of the material based on the history.

In step S409, the three-dimensional laminating and shaping apparatus 100 determines whether the created spread plan is complete and the spread of the material 120 has ended. If the spread plan is incomplete and the spread of the material 120 has not ended, the three-dimensional laminating and shaping apparatus 100 returns to step S403 to repeat the subsequent steps.

If the spread plan is complete and the spread of the material 120 has ended, the three-dimensional laminating and shaping apparatus 100 advances to step S411 to move the recoater 101 to the standby position and cool the recoater 101.

Figure 5:
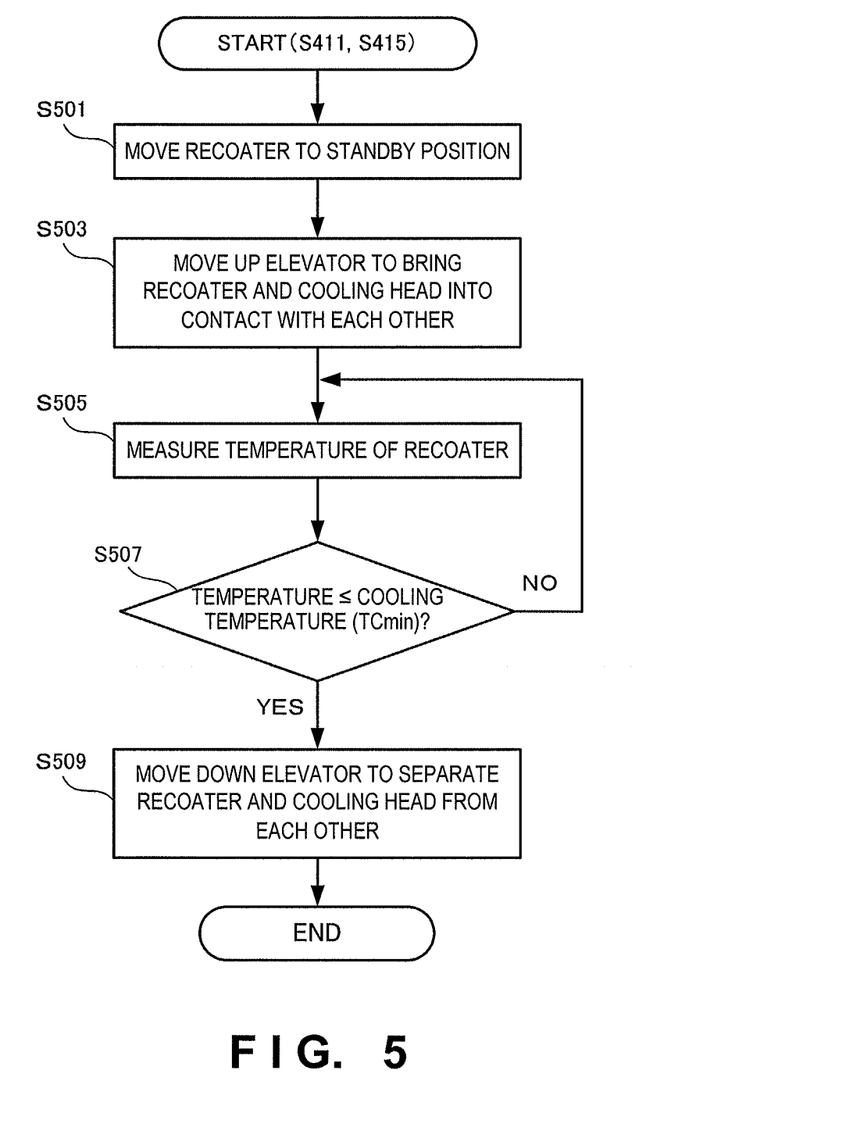
FIG. 5 is a flowchart for explaining the cooling procedure of the recoater by the three-dimensional laminating and shaping apparatus according to the first embodiment of the present invention.

FIG. 5 is a flowchart for explaining the cooling procedure of the recoater by the three-dimensional laminating and shaping apparatus 100 according to this embodiment. In step S501, the three-dimensional laminating and shaping apparatus 100 moves the recoater 101 to return to the standby position (home position). In step S503, the three-dimensional laminating and shaping apparatus 100 moves up the elevator 142 to bring the recoater 101 and the cooling head 104 into contact with each other. In step S505, the temperature measurer 102 measures the temperature of the recoater 101. In step S507, the three-dimensional laminating and shaping apparatus 100 determines whether the temperature of the recoater 101 has lowered to the cooling temperature or less. If it is determined that the temperature has not lowered to the cooling temperature or less, the three-dimensional laminating and shaping apparatus 100 returns to step S505 to repeat the subsequent steps.

If it is determined that the temperature has lowered to the cooling temperature or less, the three-dimensional laminating and shaping apparatus 100 advances to step S509. In step S509, the three-dimensional laminating and shaping apparatus 100 moves down the elevator 142 to separate the recoater 101 and the cooling head 104 from each other.

According to this embodiment, since there is no cooler or cooling pipe for cooing the recoater, it is possible to cool, by a simple structure, the recoater that is two-dimensionally driven. Furthermore, the movement of the recoater is not limited, thereby improving the accuracy of position control. Since no extra equipment is attached to the recoater, the weight of the recoater can be decreased and the recoater can be moved at high speed. Since the temperature of the recoater can be maintained within the predetermined range, and the recoater can be replenished with the material while it is at the standby position, a time loss is reduced.

Second Embodiment

Figure 7:
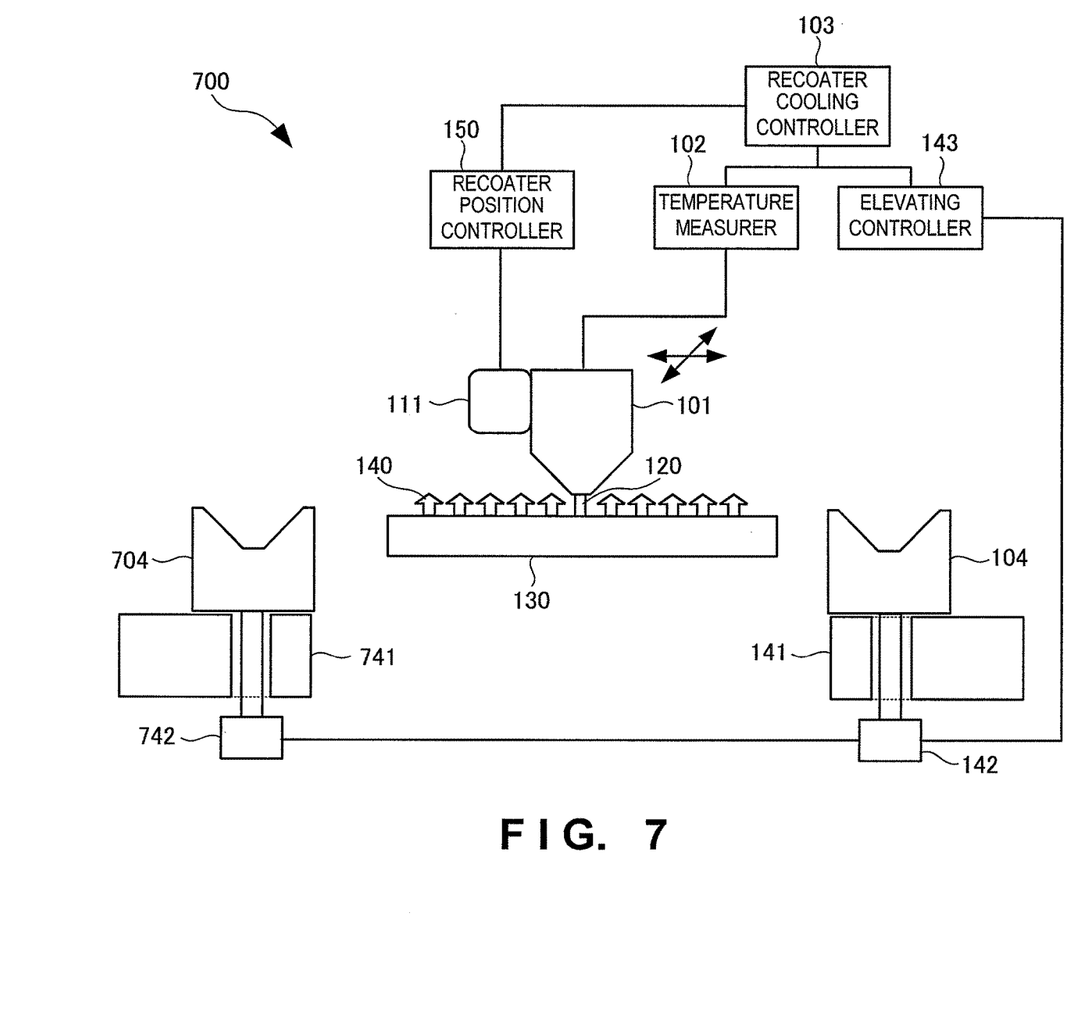
FIG. 7 is a view schematically showing the arrangement of a three-dimensional laminating and shaping apparatus according to the second embodiment of the present invention.

A three-dimensional laminating and shaping apparatus according to the second embodiment of the present invention will be described with reference to FIGS. 7 and 8. FIG. 7 is a view for schematically explaining the arrangement of a three-dimensional laminating and shaping apparatus 700 according to this embodiment. The three-dimensional laminating and shaping apparatus 700 according to this embodiment is different from that according to the first embodiment in that two cooling heads are included. The remaining components and operations are the same as those in the first embodiment. Hence, the same reference numerals denote the same components and operations, and a detailed description thereof will be omitted.

The three-dimensional laminating and shaping apparatus 700 further includes a cooling head 704. That is, the three-dimensional laminating and shaping apparatus includes two standby positions (home positions) of a recoater 101. If, as a result of temperature measurement by a temperature measurer 102, the temperature of the recoater 101 is equal to or higher than a predetermined temperature (allowable maximum temperature), an alert signal indicating that the temperature is equal to or higher than the predetermined temperature is transmitted to a recoater cooling controller 103.

Upon receiving the alert signal, the recoater cooling controller 103 moves the recoater 101 to one of the two standby positions, which is closer to the current position of the recoater 101, that is, to which the recoater 101 moves within a shorter time.

For example, if the standby position on the side of the cooling head 704 is closer, the recoater cooling controller 103 controls a recoater position controller 150 and an elevating controller 143 to bring the recoater 101 and the cooling head 704 into contact with each other. Note that if the recoater 101 is at an intermediate position between the standby positions, priority levels may be assigned to the standby positions, and the recoater 101 may be moved to the standby position having a higher priority level.

Alternatively, the recoater 101 may be alternately moved to the two standby positions regardless of its current position. By executing such control, it is possible to reliably cool a cooling head 104 (704) by a cooling medium 141 (741), and the cooling heads 104 (704) is not continuously used. Thus, a sufficient heat dissipation effect can be expected.

Figure 8:
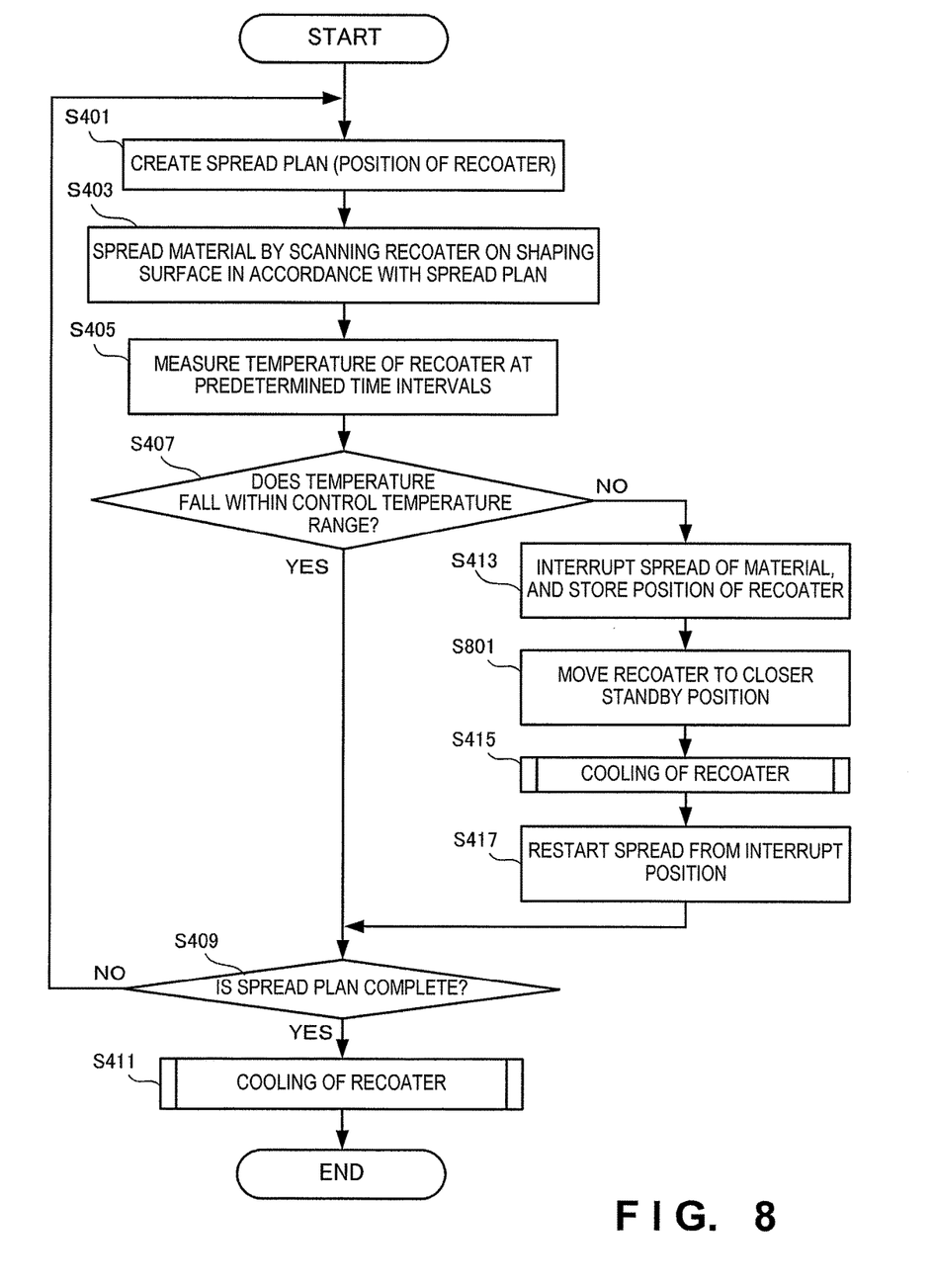
FIG. 8 is a flowchart for explaining the cooling procedure of a recoater by the three-dimensional laminating and shaping apparatus according to the second embodiment of the present invention.

FIG. 8 is a flowchart for explaining a recoater cooling procedure by the three-dimensional laminating and shaping apparatus 700 according to this embodiment. In step S801, the three-dimensional laminating and shaping apparatus 700 moves the recoater 101 to the closer standby position based on the current position of the recoater 101.

According to this embodiment, it is possible to cool the recoater more quickly, thereby shortening the shaping time of a three-dimensional laminated and shaped object.

Third Embodiment

Figure 9:
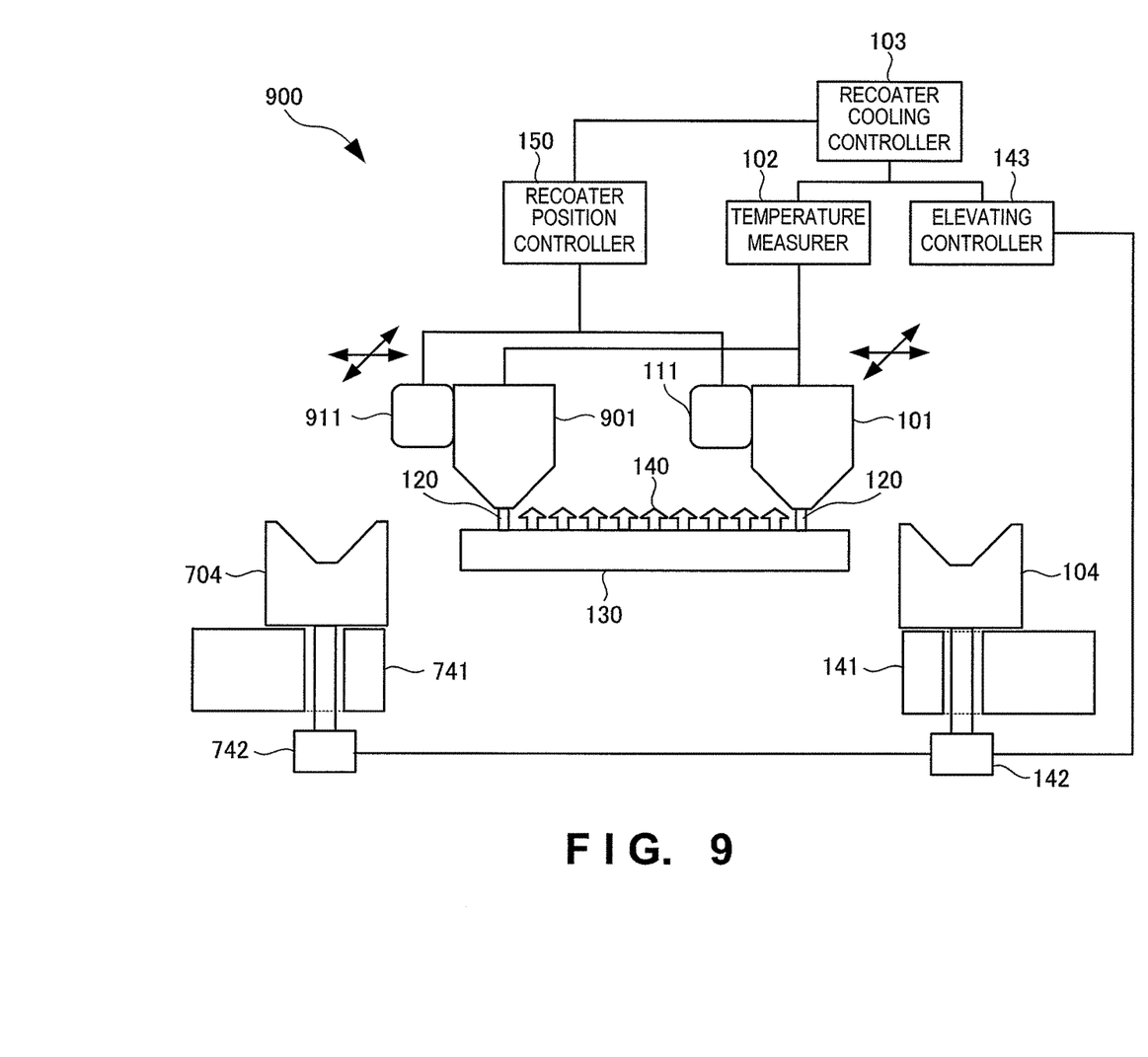
FIG. 9 is a view schematically showing the arrangement of a three-dimensional laminating and shaping apparatus according to the third embodiment of the present invention.
Figure 10:
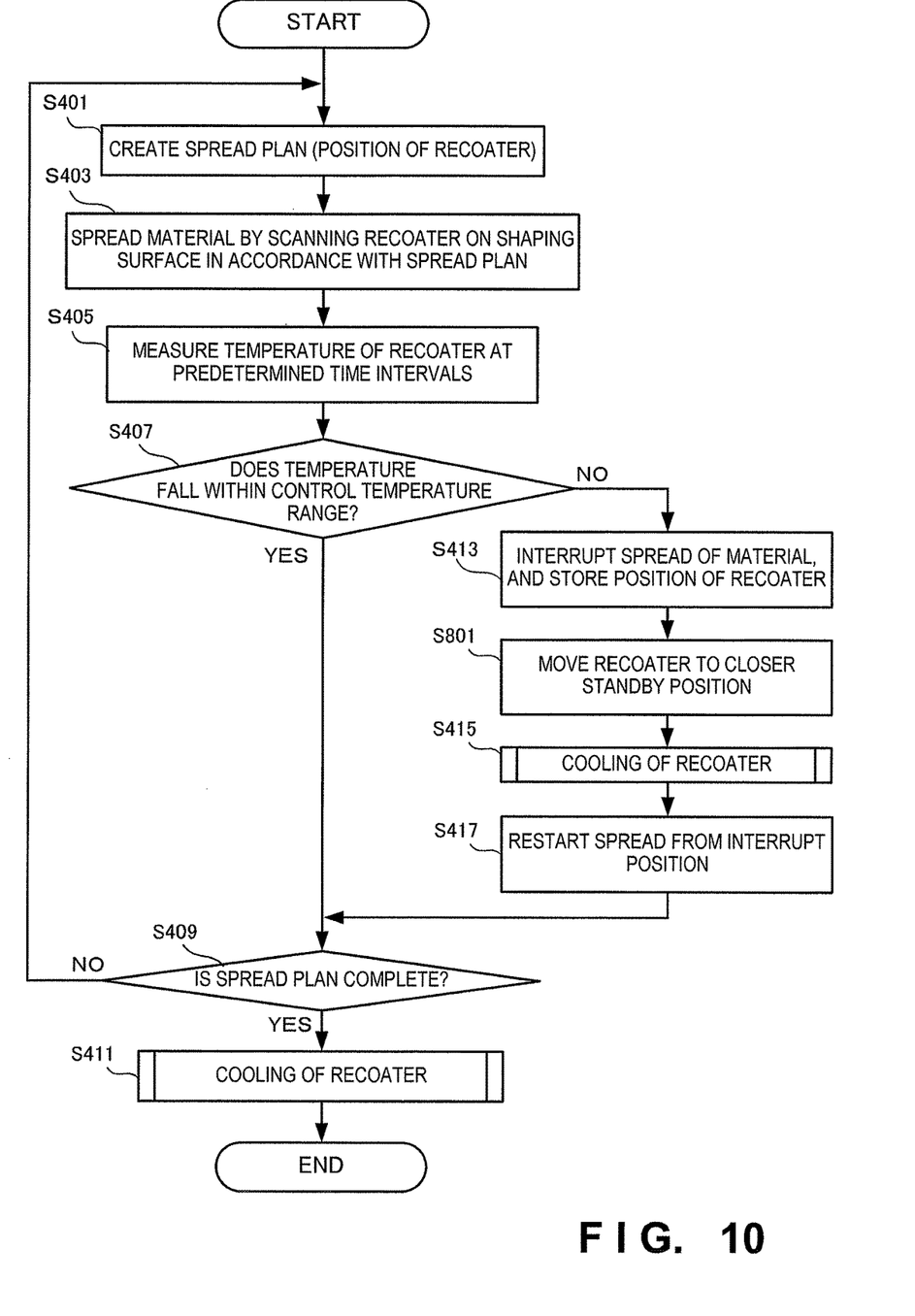
FIG. 10 is a flowchart for explaining the cooling procedure of a recoater by the three-dimensional laminating and shaping apparatus according to the third embodiment of the present invention.

A three-dimensional laminating and shaping apparatus according to the third embodiment of the present invention will be described with reference to FIGS. 9 and 10. FIG. 9 is a view for schematically explaining the arrangement of a three-dimensional laminating and shaping apparatus 900 according to this embodiment. The three-dimensional laminating and shaping apparatus 900 according to this embodiment is different from that according to the second embodiment in that two recoaters are included. The remaining components and operations are the same as those in the second embodiment. Hence, the same reference numerals denote the same components and operations, and a detailed description thereof will be omitted.

The three-dimensional laminating and shaping apparatus 900 further includes a recoater 901. Therefore, for example, while one recoater 101 (recoater 901) is cooled at a standby position, the other recoater 901 (recoater 101) may spread a material. If the same type of material is spread using the two recoaters 101 and 901, the spread time of the material can be shortened, thereby shortening the shaping time of a three-dimensional laminated and shaped object. In addition, since different types of materials can be spread using the two recoaters 101 and 901, a three-dimensional laminated and shaped object made of the different types of materials can be shaped.

According to this embodiment, since it is possible to spread the material by the two recoaters, the spread time of the material can be shortened, thereby shortening the shaping time of a three-dimensional laminated and shaped object. Furthermore, since the two recoaters are included, a plurality of materials can be spread, and the respective recoaters can be cooled.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:

at least one material spreader that spreads a material of a three-dimensional laminated and shaped object;

a temperature measurer that measures a temperature of said material spreader;

at least one cooler that cools said material spreader and is provided at a standby position at which said material spreader stands by while the material is not spread; and a controller that controls said material spreader, wherein said controller moves said material spreader to the standby position to bring said material spreader and said cooler into contact with each other.

2. The three-dimensional laminating and shaping apparatus according to claim 1, wherein when the spread of the material by said material spreader ends, said controller moves said material spreader to the standby position to bring said material spreader and said cooler into contact with each other.

3. The three-dimensional laminating and shaping apparatus according to claim 1, wherein if the temperature of said material spreader exceeds a predetermined temperature during the spread of the material, said controller interrupts the spread of the material, and moves said material spreader to the standby position to bring said material spreader and said cooler into contact with each other.

4. The three-dimensional laminating and shaping apparatus according to claim 3, further comprising:

a history storage that stores a history of the spread of the material by said material spreader, wherein if the spread of the material is interrupted, said controller restarts the spread of the material based on the history.

5. The three-dimensional laminating and shaping apparatus according to claim 1, further comprising:

a material replenisher that replenishes said material spreader with the material, wherein said material replenisher replenishes the material spreader with the material while said material spreader is at the standby position and said material spreader and said cooler are in contact with each other.

6. A control method of a three-dimensional laminating and shaping apparatus, comprising:

spreading a material by a material spreader;

measuring a temperature of the material spreader; and controlling movement of the material spreader so as to bring, into contact with each other, the material spreader and a cooler of the material spreader, that is provided at a standby position at which the material spreader stands by while the material is not spread.

7. A non-transitory computer readable medium storing a control program of a three-dimensional laminating and shaping apparatus, for causing a computer to execute a method, comprising:

spreading a material by a material spreader;

measuring a temperature of the material spreader; and controlling movement of the material spreader so as to bring, into contact with each other, the material spreader and a cooler that cools the material spreader and is provided at a standby position at which the material spreader stands by while the material is not spread.

* * * * *